(12) United States Patent
Turner

(10) Patent No.: US 7,429,054 B1
(45) Date of Patent: Sep. 30, 2008

(54) NON-DROP TORSION BAR BRACKET AND ASSEMBLY

(75) Inventor: Mark Turner, Jackson, TN (US)

(73) Assignee: Heckethorn Products, Inc., Dyersburg, TN (US)

( * ) Notice: Subject to any disclaimer, the term of this patent is extended or adjusted under 35 U.S.C. 154(b) by 225 days.

(21) Appl. No.: 11/302,901

(22) Filed: Dec. 14, 2005

(51) Int. Cl.
*B60G 3/14* (2006.01)
*B60G 21/055* (2006.01)

(52) U.S. Cl. ............................................. 280/124.128
(58) Field of Classification Search .......... 280/124.128, 280/124.125, 124.109, 124.11
See application file for complete search history.

(56) References Cited

U.S. PATENT DOCUMENTS

| | | | |
|---|---|---|---|
| 2,734,753 A | 2/1956 | Lind ........................ 280/96.2 |
| 3,604,724 A * | 9/1971 | Corbin ................ 280/124.107 |
| 3,773,349 A * | 11/1973 | Boyd ................... 280/124.107 |
| 4,203,615 A * | 5/1980 | Cislo et al. ............ 280/124.106 |
| 4,234,205 A * | 11/1980 | Thiesce ................ 280/124.107 |
| 4,344,642 A | 8/1982 | Goth .......................... 280/682 |
| 4,501,436 A * | 2/1985 | Ishida ................. 280/124.108 |
| 4,526,400 A * | 7/1985 | Kijima et al. ......... 280/124.128 |
| 4,529,222 A * | 7/1985 | Kijima et al. ......... 280/124.128 |
| 4,623,164 A | 11/1986 | Cassel et al. ................ 280/689 |
| 4,629,226 A | 12/1986 | Cassel et al. ................ 285/382 |
| 4,660,862 A | 4/1987 | Cassel et al. ................ 285/114 |
| 4,813,720 A | 3/1989 | Cassel ........................ 285/419 |
| 4,825,970 A * | 5/1989 | McVicar et al. ............ 180/53.7 |
| 4,906,018 A * | 3/1990 | Kijima et al. ......... 280/124.109 |
| 4,943,081 A * | 7/1990 | Golpe ................. 280/124.109 |
| 5,181,736 A * | 1/1993 | Kokubun ............. 280/124.109 |
| 5,240,279 A * | 8/1993 | Kunert .................. 280/86.753 |
| 5,310,210 A | 5/1994 | Delbeke et al. ............. 280/673 |
| 5,560,651 A * | 10/1996 | Kami et al. .................. 280/788 |
| 5,707,073 A * | 1/1998 | Stuker et al. ............. 280/89.11 |
| 5,794,965 A * | 8/1998 | Stuker et al. .......... 280/124.169 |
| 6,070,892 A * | 6/2000 | Noutomi et al. ....... 280/124.137 |
| 6,305,699 B1 | 10/2001 | Konig ......................... 280/124 |
| D475,001 S | 5/2003 | Roll ............................. 12/159 |
| 6,679,517 B2 * | 1/2004 | Proia ........................... 280/682 |
| 6,702,308 B2 | 3/2004 | Yamaguchi ................. 280/124 |
| 6,767,021 B2 | 7/2004 | Schnurpel ................... 280/124 |
| 6,860,499 B2 | 3/2005 | Gerrard ...................... 280/124 |
| 6,921,097 B2 * | 7/2005 | Ohlsson ............... 280/124.109 |
| 2006/0049600 A1 * | 3/2006 | Dudding et al. ........ 280/124.11 |
| 2006/0071441 A1 * | 4/2006 | Mathis ................. 280/124.128 |
| 2006/0273540 A1 * | 12/2006 | Heron et al. .......... 280/124.116 |
| 2007/0246904 A1 * | 10/2007 | Murata et al. ......... 280/124.128 |

* cited by examiner

*Primary Examiner*—Kevin Hurley
*Assistant Examiner*—Karen Amores
(74) *Attorney, Agent, or Firm*—Waddey & Patterson P.C.; Ryan D. Levy

(57) ABSTRACT

The present invention discloses a vehicle lift kit that allows a vehicle to be lifted or raised from the ground without moving the stock torsion bar bracket and assembly. The present lift kit has a drop bracket having a front pivot point, a rear pivot point, and a torsion bar socket for receiving a torsion bar of the vehicle. The lift kit also provides a link attached to the front pivot point of the drop bracket and a stock control arm and a bracket attachable to the rear pivot point of the drop bracket and the stock control arm. The drop bracket may have a bump stop pad. The link attaches to a shock mount of the stock control arm. The bracket is attaches to a pivot point of the stock control arm. The link has a body joining an upper hole and a lower hole.

3 Claims, 9 Drawing Sheets

15

NON-DROP TORSION BAR BRACKET AND ASSEMBLY

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

All patents and publications described or disclosed herein are hereby incorporated by reference in their entirety.

BACKGROUND OF THE INVENTION

The present invention relates generally to a system relating to the suspension system for a motorized vehicle. More specifically, the invention relates to a system that raises the frame of a motorized vehicle farther from the ground to provide greater ground clearance without requiring that the existing or original equipment suspension system be damaged or cut. More specifically the present invention relates to a non-drop torsion control bracket that can be attached to a motorized vehicle to allow more ground clearance while allowing the stock torsion bars to be placed at the same angle and/or not moved from their stock position.

It will be appreciated by those of ordinary skill in the art that motor vehicles have a suspension system having various devices to allow vertical movement of the wheel with respect to the frame. In modern vehicles this system may include a shock absorber, a torsion bar, and a bump stop contacting with or attached to a control arm. The control arm attaches to a ball joint that attaches to the wheel assembly. The control arm is pivotally connected to the frame of a vehicle such as by a pivot point attached to the frame. The control arm pivots about the pivot point as the wheel moves upwardly and downwardly with respect to the frame so that the wheel can move vertical somewhat independently of the frame of the vehicle. If the control arm did not allow the wheel to move somewhat independently, the vehicle's ride would be very rough indeed. Therefore, to make the vertical movements of the wheel less pronounced upon the vehicle and its passengers, the shock absorber provides somewhat vertical shock absorption dampening vertical movement, the torsion bar provides some torsional absorption but also prevents the control arm from moving laterally, and the bump stop provides some additional absorption.

Stock vehicles are provided with a set ground clearance. For example on General Motors Heavy Duty trucks and sport utility vehicles, the standard clearance is 13 to 15 inches. However, some owners wish to increase this clearance to 15 to 26 inches so that the vehicle may be driven over less consistent terrain and larger wheels and tires can be used. In this instance, a suspension lift kit can be added to the vehicle to achieve greater clearance.

The most common lift kits today either require that the frame be cut or that frame rivets that attach the torsion bar to the frame be cut away. As a result, present lift kits not only damage the stock equipment but also prevent the vehicle from being returned to stock or original condition. Over time, consumers often wish the vehicle to be returned to stock so that the vehicle may be sold in its original condition or used as something other than an off the road vehicle. The fact that exiting lift kits do not allow this certainly affects the future value of the altered vehicles.

There are many examples of lift kits that have been used in the past and are presently being used. Some examples of control arms and lift kits are disclosed by U.S. Pat. Nos. D475,001; 2,734,753; 5,310,210; 6,305,699; 6,702,308; 6,767,021; and 6,860,499 as well as Published Application 2004/0075234 A1. However, these systems will not work to raise the frame on modern vehicles such as General Motors Heavy Duty trucks and sport utility vehicles in such a way as to allow the vehicle to be returned to its original equipment later. These patents are incorporated by reference.

What is needed is a lift kit that does not irreversibly damage or alter the vehicle's stock equipment. This needed lift kit must be usable in connection with a lift kit that does cut or otherwise damage the stock frame such as the differential. This needed lift kit must be easy to install. This needed system must raise the frame without altering the alignment of the torsion bar and bump stop. This needed system must avoid the relocation of the torsion bar. This needed system must maintain the range of motion allowed by the stock-located torsion bar. This needed system must maintain the stock distance between the torsion bar and the stock control arm in the placement of the torsion bar in contact with the new control arm. This needed system is presently lacking in the art.

BRIEF SUMMARY OF THE INVENTION

The present invention discloses a vehicle lift kit that allows a vehicle to be lifted or raised from the ground without moving the stock torsion bar bracket. The present lift kit has a drop bracket having a front pivot point, a rear pivot point, and a torsion bar socket for receiving a torsion bar of the vehicle. The lift kit also provides a link attached to the front pivot point of the drop bracket and a stock control arm and a bracket attachable to the rear pivot point of the drop bracket and the stock control arm. The lift kit may also provide a rear suspension cross member that attaches to the stock frame to secure the stock control arm and the drop bar to the frame. The drop bracket may have a bump stop pad. The link attaches to a shock mount of the stock control arm. The bracket is attached to a pivot point of the stock control arm. The link has a body joining an upper hole and a lower hole.

The torsion bar and the torsion bar adjuster bracket are not relocated. The torsion bar in reference to the stock pivot point and range of motion remains the same as stock.

It is therefore a general object of the present invention to provide a lift kit that does not irreversibly damage or alter the vehicle's stock equipment but can be used in connection with a lift kit that does cut or otherwise alter the stock equipment.

Another object of the present invention is to provide a system that is easy to install.

Still another object of the present invention is to provide a system that can raise the frame without altering the alignment of the torsion bar and bump stop.

A yet further object of the present invention is to avoid the relocation of the torsion bar.

Another object of the present invention is to provide a system that can maintain the range of motion allowed by the stock-located torsion bar.

Still another object of the present invention is to provide a system that maintains the stock distance between the torsion bar and the stock control arm in the placement of the torsion bar in contact with the new control arm.

Other objects, features, and advantages of the present invention will be readily apparent to those skilled in the art upon reading the following disclosure when taken in conjunction with the accompanying drawings.

DETAILED DESCRIPTION OF THE INVENTION

Figure 1:
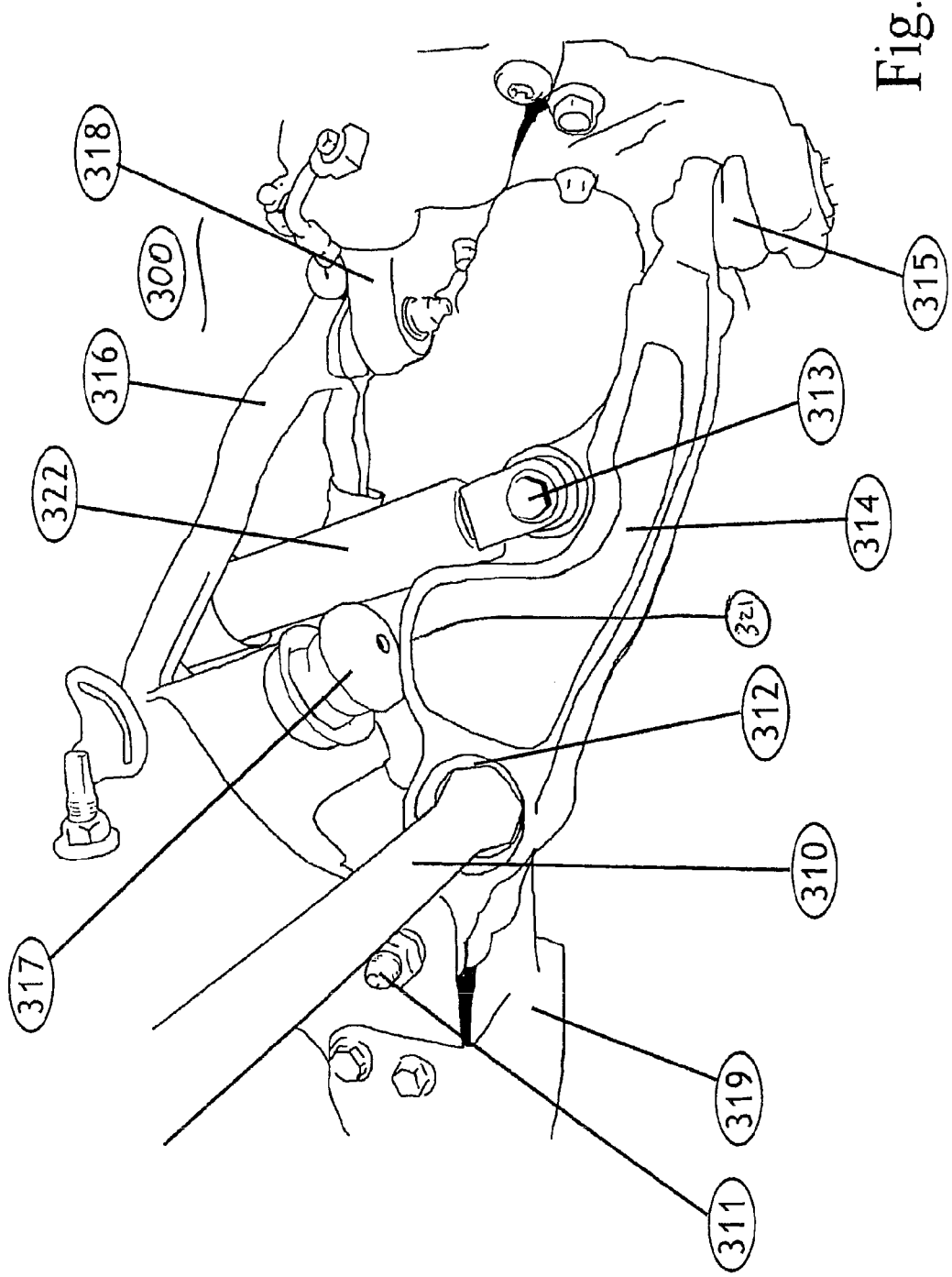
FIG. 1 is a side view of the stock or existing suspension assembly of a motor vehicle.
Figure 2:
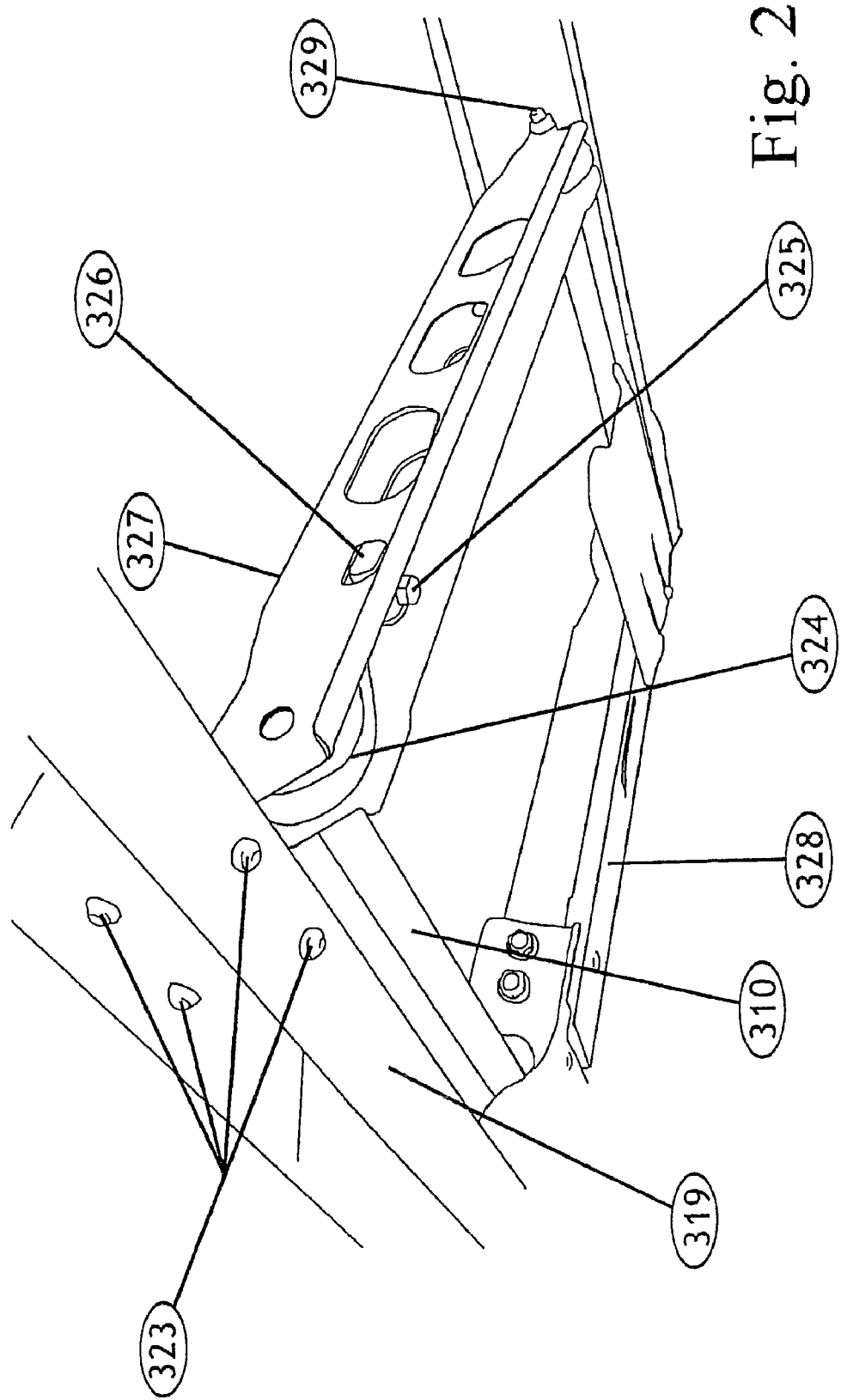
FIG. 2 is a rear perspective view of the frame assembly of a motor vehicle.

FIGS. 1 and 2 show a stock or existing suspension assembly 300 for a motor vehicle. Stock torsion bar 310 is joined on one end to the frame torsion bar cross member 328 that includes a torsion bar adjuster assembly 324 and is received at the other end by the torsion bar socket 312 in the stock lower control arm 314. The stock lower control arm 314 is pivotally connected to the stock frame 319 by stock lower control arm pivot point 311. The stock lower control arm 314 also has stock lower shock mount 313 that pivotally attaches to a stock shock absorber 322. The stock lower control arm 314 is joined to stock lower ball joint 315 providing connection from the stock frame 319 to the ball joint 315 and therefore to the wheel assembly (not shown). The stock lower control arm 314 is also provided with a stock bump stop pad 321 that contacts stock bump stop 317. The stock assembly 300 is also provided with an upper control arm 316 joined to stock steering knuckle 318.

Figure 3:
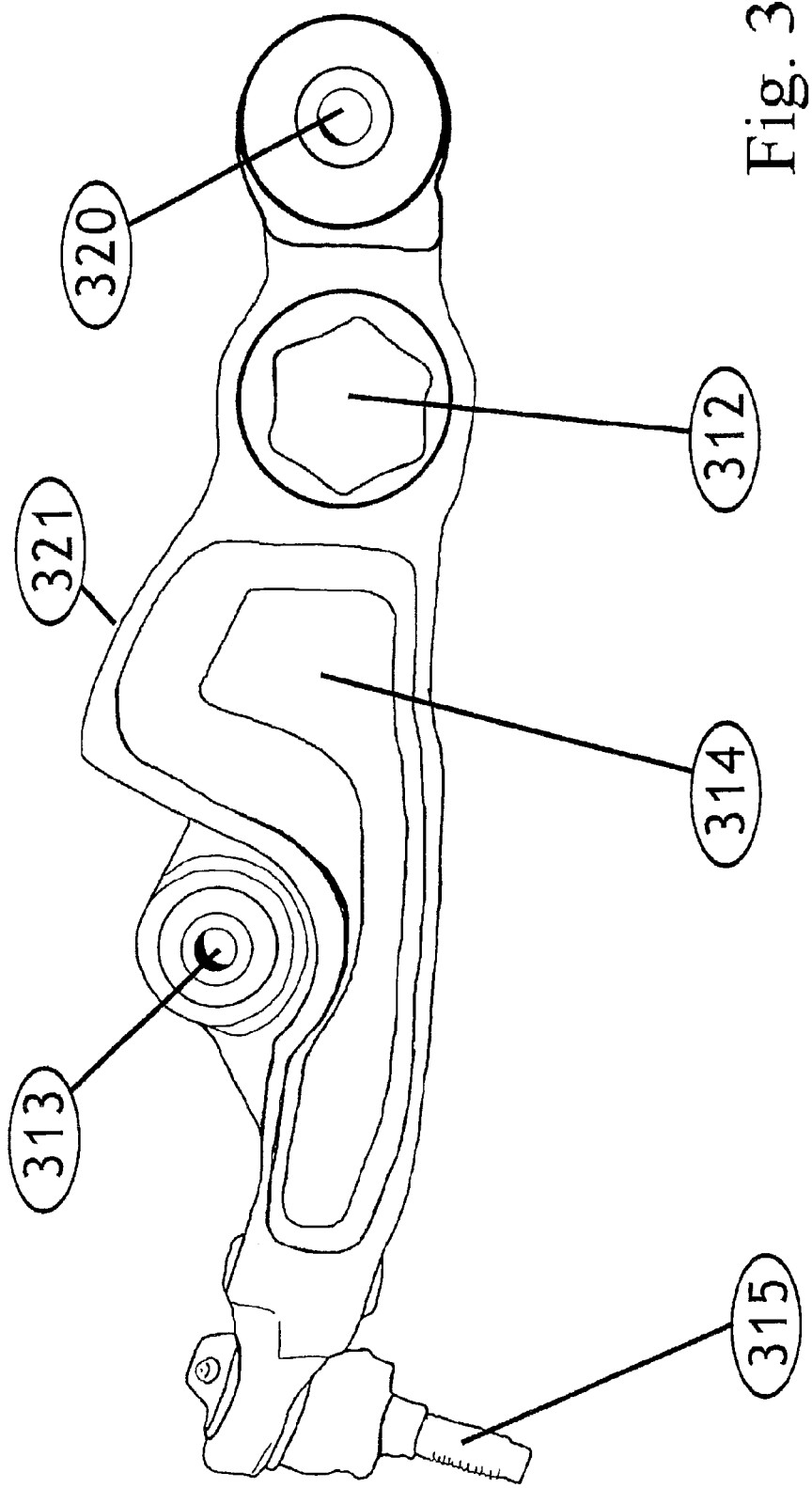
FIG. 3 is a side view of the stock or existing lower control arm of a motor vehicle.

FIG. 3 shows the stock lower control arm 314. The stock lower control arm 314 is provided with stock lower ball joint 315 at one end and stock lower control arm bushing and bolt 20 at the other. The stock lower control arm 314 is also provided with the stock torsion bar socket 312, stock bump stop pad 321, and stock shock mount 313.

Referring now to FIG. 2, one can see the interaction between the suspension assembly 300 of FIG. 1 and the stock frame 319. The stock torsion bar 310 attaches to the stock frame 319 with stock frame rivets 323 that attach the stock torsion bar adjuster bracket 327 to the stock frame 319. The adjuster bracket 327 is adjusted by stock torsion bar adjuster 324 through use of adjuster bolts 325 and adjuster nuts 326 connected to stock frame cross member 328. Additionally, the assembly is also provided with a torsion bar adjuster bracket bolt 329. As discussed above, existing lift kits often require that the frame rivets 323 be cut and removed so that the torsion bar 310 can be moved.

Figure 4:
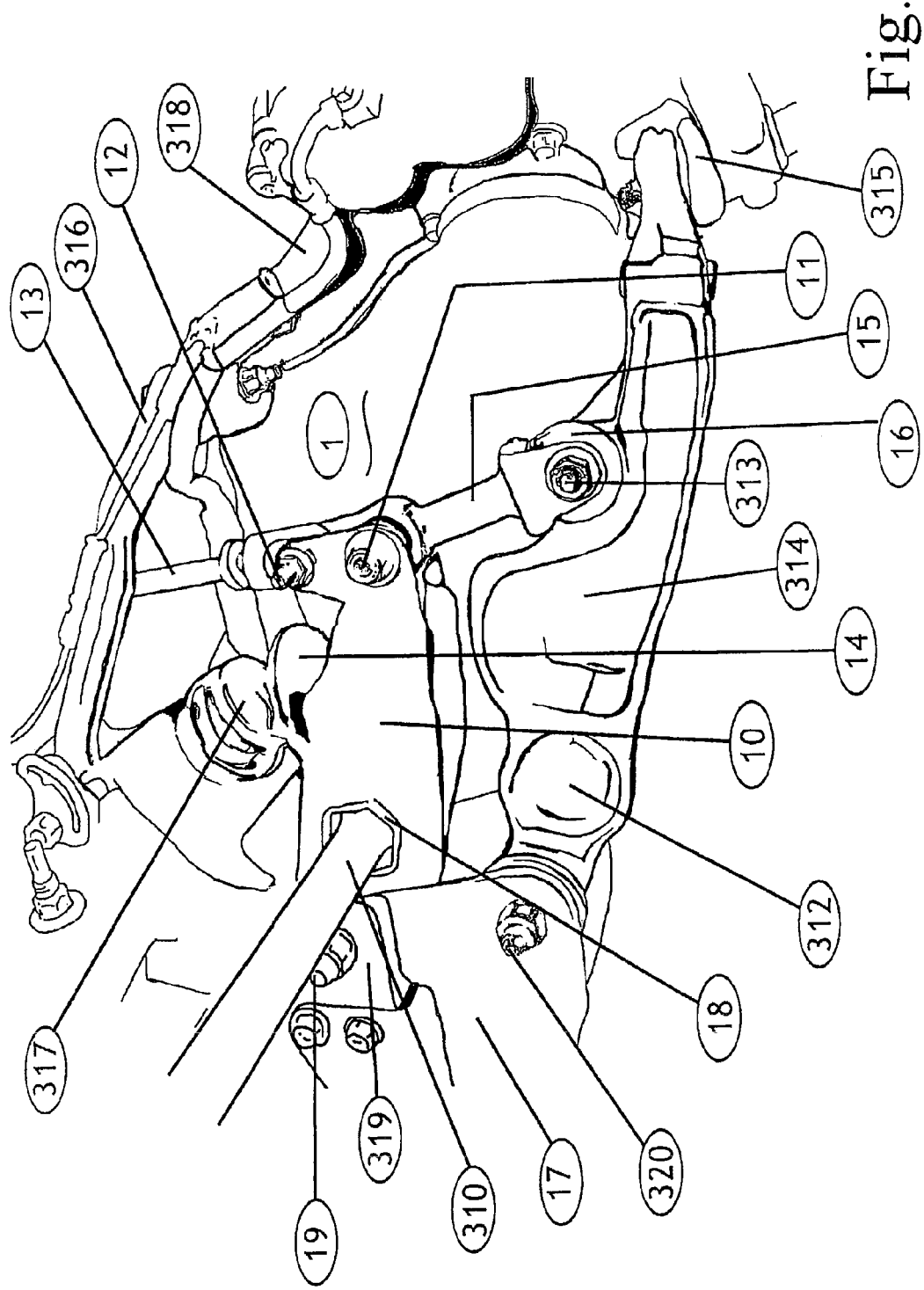
FIG. 4 is a side view of the suspension assembly of a motor vehicle having the non-drop torsion bar bracket.

Referring now to FIG. 4, there is shown generally at 1 the non-drop torsion bar bracket assembly of the present invention used in connection with a vehicle's wheel assembly 300. The assembly 1 can also be referred to as a system or apparatus. The assembly 1 initially has a non-torsion bar drop bracket 10 pivotally attached by a bolt and front pivot point 11 to bracket link 15. The bracket 10 has a lower shock mount 12 to attach to an aftermarket shock 13. The existing shock absorber 322 can be maintained. However, when an individual raises a frame, the individual usually wishes to replace the stock shock absorber 322 with an aftermarket shock 13 intended for more rigorous terrain. The bracket 10 has a non-torsion bar drop bracket bump stop pad 14 that allows the bracket 10 to remain in contact with the stock bump stop 317. The non-torsion bar drop bracket link 15 joins the bracket 10 to the stock lower control arm 314 using the stock lower shock mount 313 with the cooperation of a bushing 16 that is preferably an ultra high molecular weight bushing and metal sleeve. A rear suspension cross member 17 is attached to the stock frame 319 and to the bracket 10 using rear pivot point 19 using an attachment such as a bushing, sleeve, bolt and washer assembly 21. The cross member 17 joins bracket 10 to bracket 314 as well.

Figure 5:
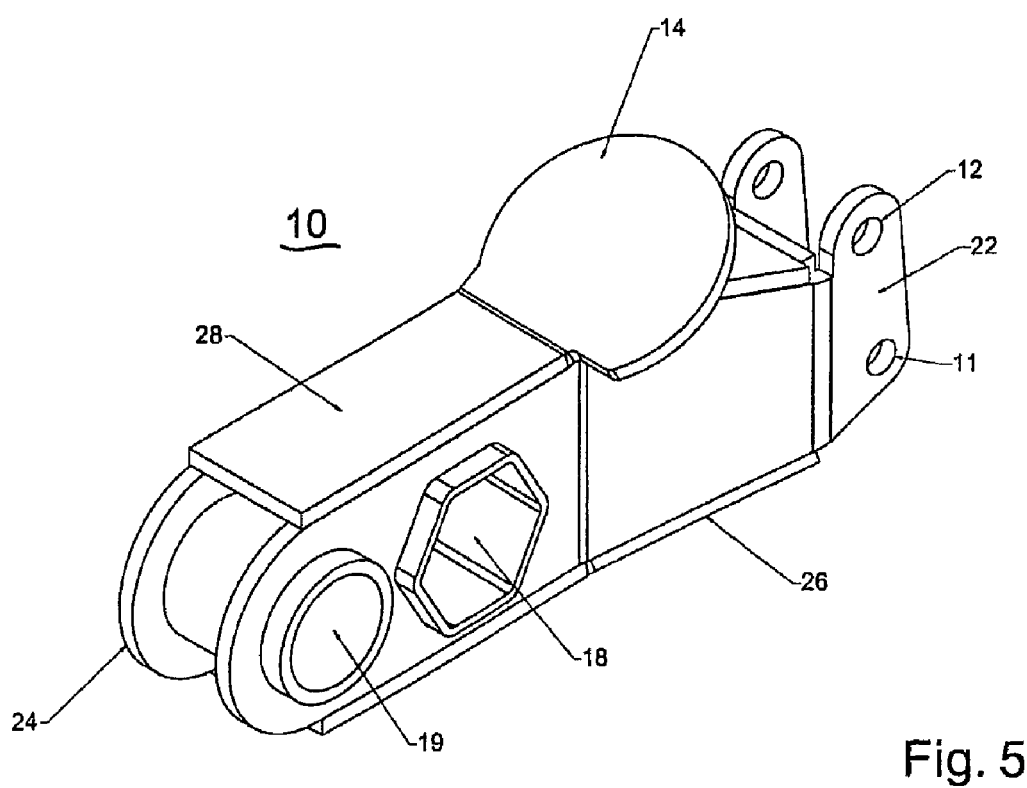
FIG. 5 is a perspective view of one embodiment of the non-drop torsion bar bracket of the present invention.

FIG. 5 shows one embodiment of the drop bracket 10 of the present invention. The drop bracket has a rear pivot point 19 at one end and front pivot point 11 at the other. Proximal front pivot point 11, there is a shock mount 12. In the preferred embodiment, pivot points 11, 19 may are holes placed through bracket 10 that may be reinforced and/or have a bearing pad through which pins or bolts or something similar is placed. However, pivots points 11, 19 may also be cooperative holes such as shown in FIG. 5 as the shock mount 12 and the front pivot point 11 in FIG. 5 which is preferably a c-shaped bracket. Bracket 10 also has a drop bracket torsion bar socket 18 and a bump stop pad 14. In the preferred embodiment, front pivot point 11 is substantially 14 mm in diameter but can be sized in any way cooperative with upper hole (32 in FIG. 6) of bracket link (15 in FIG. 4). Preferably torsion bar socket 18 is hexagonally shaped to correspondence to the size and shape of the stock torsion bar (310 in FIG. 1 and FIG. 4) and is preferably 33 inches from opposing sides and 1.25 inches deep. Likewise, bump stop pad 14 is sized and shaped similarly to stock bump stop pad (321 in FIG. 3). Drop bracket 10 has lower edge 26 opposing upper edge 28 and leading edge 22 opposing trailing edge 24.

Figure 6:
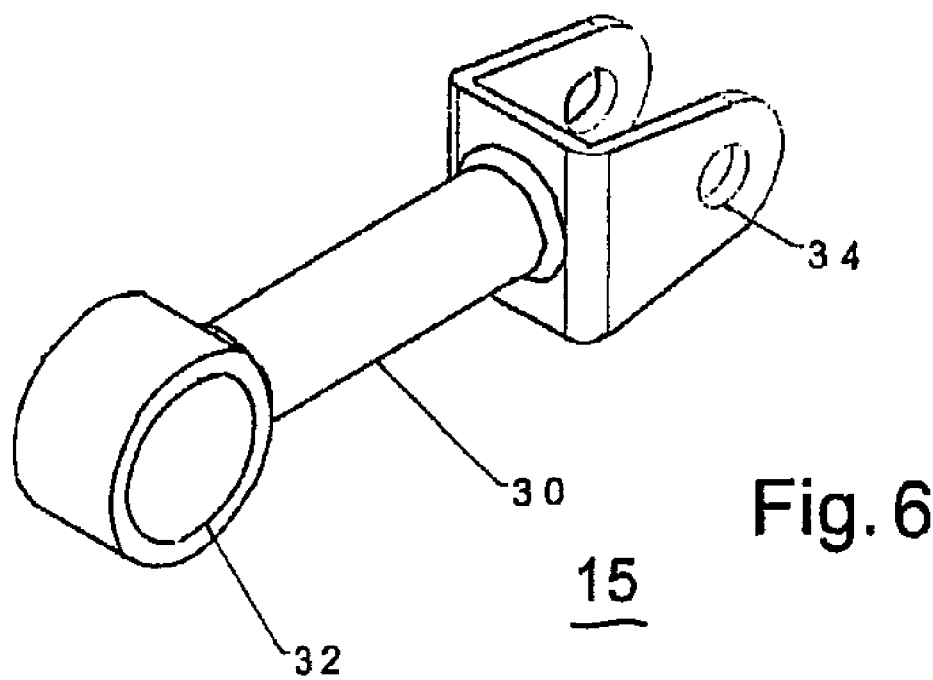
FIG. 6 is a perspective view of the link of the present invention.

As shown in FIG. 6, bracket link 15 has a preferably elongated body 30 joining an upper hole 32 to a lower hole 34. Preferably, the bracket link is substantially 4, 6 or 8 inches long depending upon the amount of desired lift.

Figure 7:
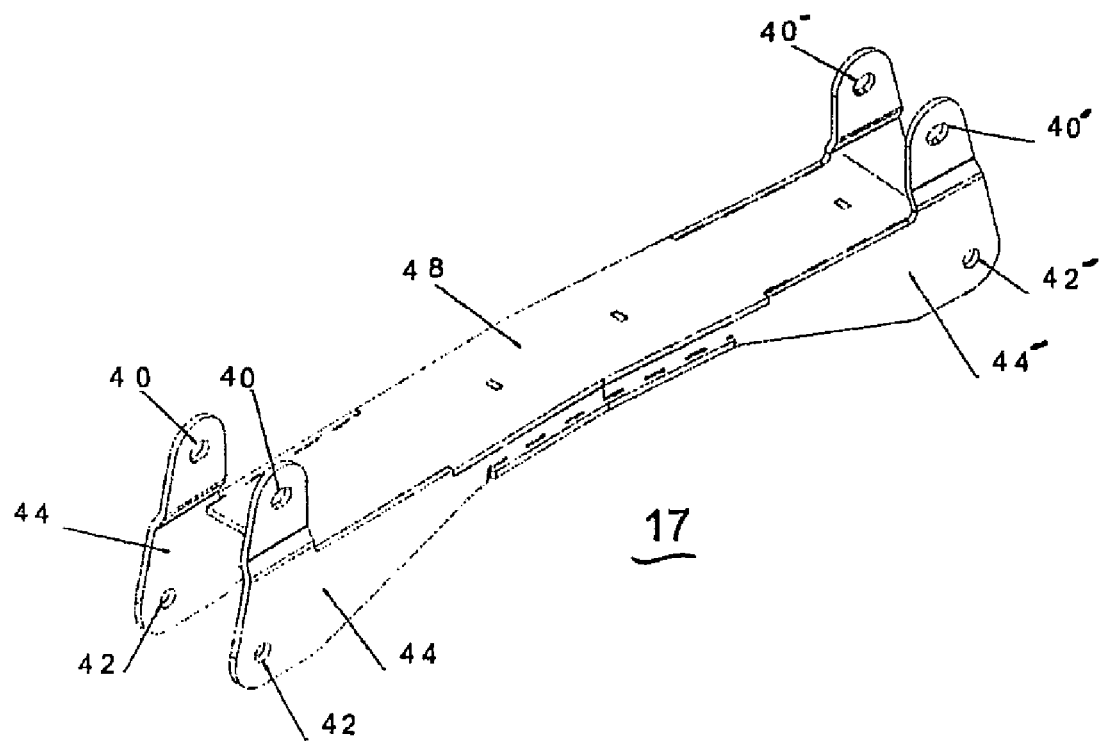
FIG. 7 is a perspective view of the rear suspension cross member of the present invention.

As shown in FIG. 7, there is shown generally at 17 the rear suspension cross member of the present invention having a body 44 and body 44' joined by bridge 48. In the preferred embodiment, body 44 is actually a two-part flange system that joins the cross member 17 to the stock frame. Body has upper orifice 40 for attachment to rear pivot point (19 in FIG. 4) and to stock frame (319 in FIG. 4) and a lower orifice 42 for attachment rear pivot point (320 in FIG. 1). Likewise, body 44' has companion upper orifice 40' and lower orifice 42 used in connection with the other suspension assembly and wheel assembly. Member 17 also is provided with a rear orifice 46 for attachment to the stock frame (319 in FIG. 2). In the preferred embodiment, the distance between upper orifice 40 and lower orifice 42 is substantially preferably 4, 6, or 8 inches depending upon the amount of desired lift. In the preferred embodiment, the distance The after market shock absorber 13 is preferably any gas charged, hydraulic or Monotube type shock absorber such as Gabriel.

Figure 8:
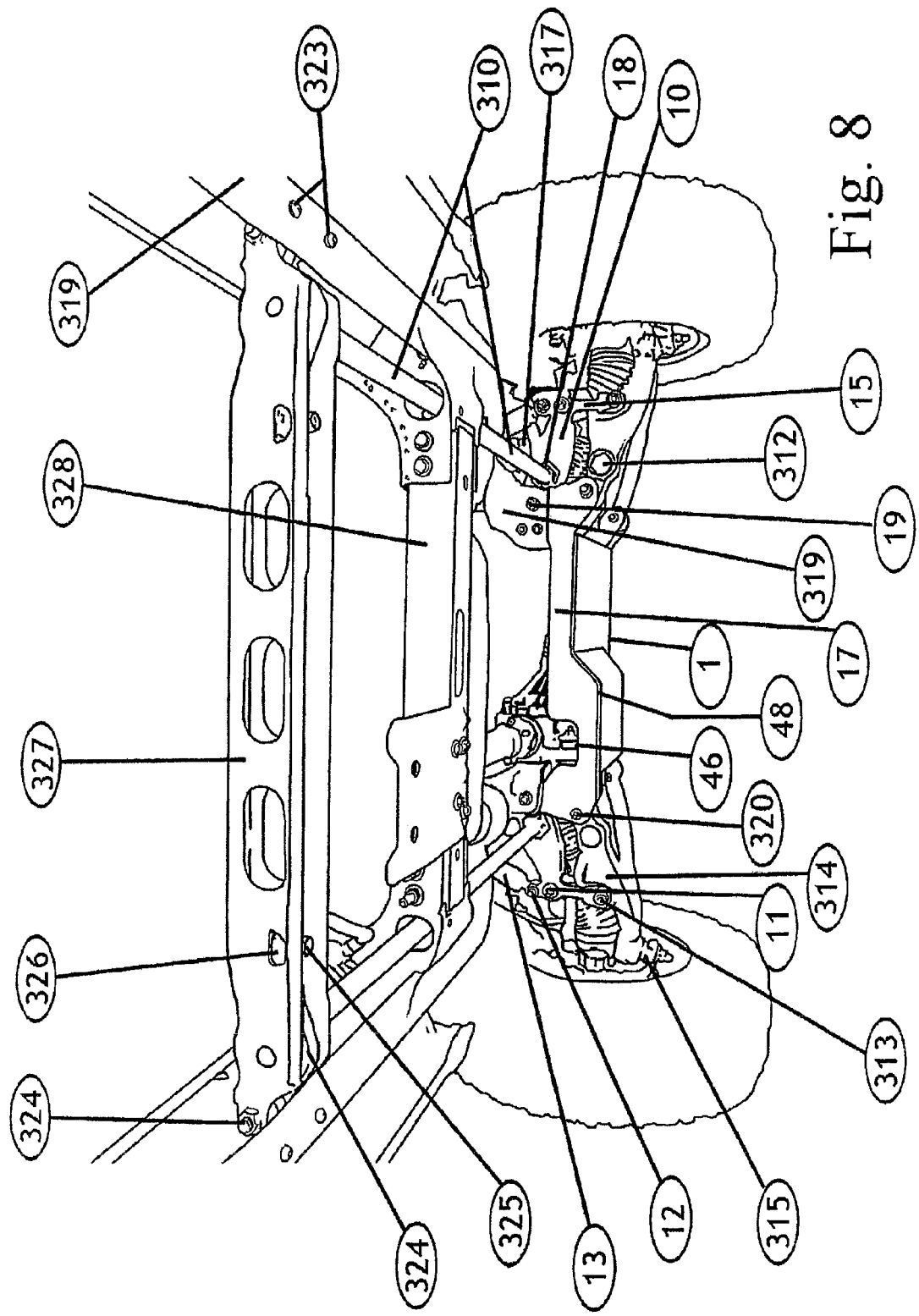
FIG. 8 is a perspective view of the non-drop torsion bar bracket used in a vehicle in which the stock frame has been altered.

FIG. 8 shows the drop bracket 11 and link 15 of the present invention used in connection with a cut or altered stock frame. In this embodiment, the stock frame has been changed by cutting the drivers side, lower differential frame mount off the vehicle. As can be seen, the drop bracket 11 and the link 15 are as discussed above. However, in this embodiment, the cross member 17 has an offset in bridge 48 so that the front differential can pass over the cross member 17. Otherwise, the link 19 and the drop bracket 10 attach to the stock frame 319 in the same manner discussed above. The assembly 1 initially has a non-torsion bar drop bracket 10 pivotally attached by a bolt and front pivot point 11 to bracket link 15. The bracket 10 has a lower shock mount 12 to attach to an aftermarket shock 13. The existing shock absorber 322 can be maintained. However, when an individual raises a frame, the individual usually wishes to replace the stock shock absorber 322 with an aftermarket shock 13 intended for more rigorous terrain. The bracket 10 has a non-torsion bar drop bracket bump stop pad 14 that allows the bracket 10 to remain in contact with the stock bump stop 317. The non-torsion bar drop bracket link 15 joins the bracket 10 to the stock lower control arm 314 using the stock lower shock mount 313 with the cooperation of a bushing 16 that is preferably an ultra high molecular weight bushing and metal sleeve. A rear suspension cross member 17 is attached to the stock frame 319 and to the bracket 10 using rear pivot point 19 using an attachment such as a bushing, sleeve, bolt and washer assembly 21. The cross member 17 joins bracket 10 to bracket 314 as well.

Figure 9:
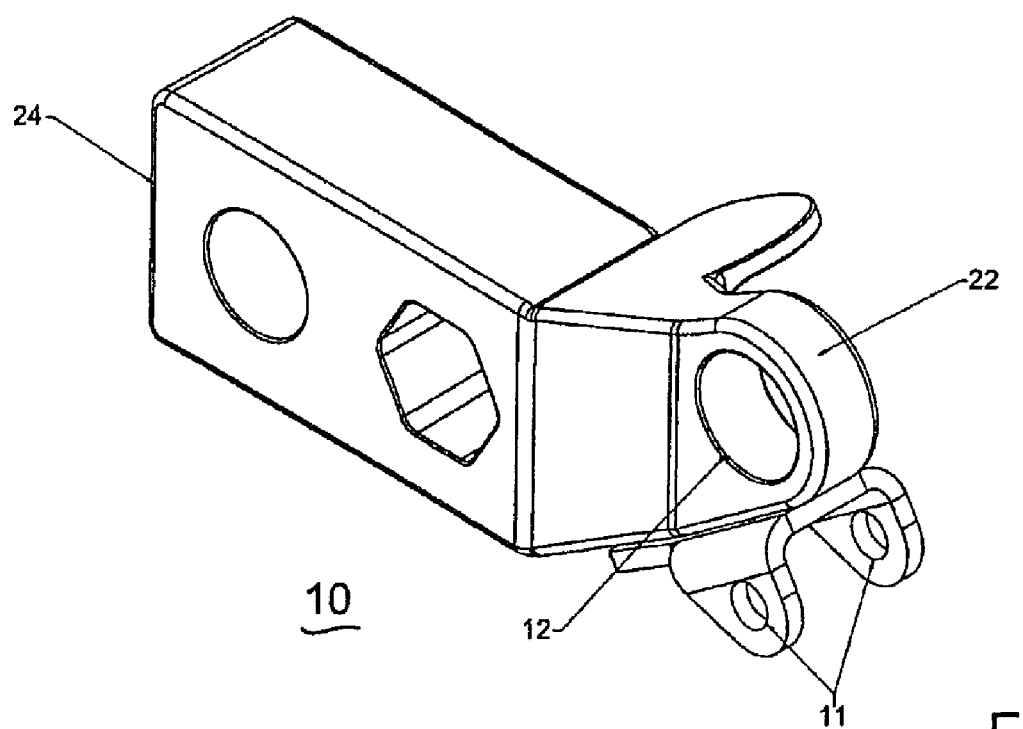
FIG. 9 is an alternative embodiment of the drop bracket of the present invention.

FIG. 9 shows yet another embodiment of the drop bracket 10 of the present invention. In this embodiment, trailing edge 24 has been squared. Further, leading edge 22 has been changed such that front pivot point 11 remains part of a C-shaped bracket while lower shock mount 12 is a hole placed through the leading edge 22. As can be appreciated, the roles can be reversed or the pivot point 11 and lower shock mount 12 can both be holes placed through leading edge 22.

Thus, although there have been described particular embodiments of the present invention of a new and useful Non-Drop Torsion Bar Bracket and Assembly, it is not intended that such references be construed as limitations upon the scope of this invention except as set forth in the following claims.

What is claimed is:

1. A vehicle lift kit attachable to a vehicle having a frame, the vehicle lift kit comprising:
 a drop bracket having a front pivot point, a rear pivot point, and a torsion bar socket for receiving a torsion bar of the vehicle;
 a link attachable to the front pivot point of the drop bracket and a stock control arm with the stock control arm having a trailing pivot point; and
 a rear suspension cross member for attaching to the frame of the vehicle, with the rear suspension cross member having an upper orifice for attaching to the rear pivot point of the drop bracket, and with the rear suspension cross member having a lower orifice for attaching to the trailing pivot point of the stock control arm.

2. The lift kit of claim 1 wherein the rear cross member further comprises a bridge joining the body to a second body.

3. A non-torsion bar drop assembly attached to a vehicle with a frame, the non-torsion bar drop assembly comprising:
 a drop bracket having a front pivot point, a rear pivot point, and a torsion bar socket receiving a torsion bar of the vehicle;
 a link pivotally attached to the front pivot point of the drop bracket and a stock control arm of the vehicle with the stock control arm having a trailing pivot point;
 a rear suspension cross member attached to the frame of the vehicle, the rear suspension cross member having a body with an upper orifice attached to the rear pivot point and a lower orifice attached to the trailing pivot point.

* * * * *